US012259973B2

(12) United States Patent
Agarwal et al.

(10) Patent No.: US 12,259,973 B2
(45) Date of Patent: Mar. 25, 2025

(54) SYSTEMS AND METHODS FOR FLUSH PLUS RELOAD CACHE SIDE-CHANNEL ATTACK MITIGATION

(71) Applicant: Microsoft Technology Licensing, LLC, Redmond, WA (US)

(72) Inventors: Ishwar Agarwal, Redmond, WA (US); Bharat Pillilli, El Dorado Hills, CA (US); Vishal Soni, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 236 days.

(21) Appl. No.: 17/838,446

(22) Filed: Jun. 13, 2022

(65) Prior Publication Data
US 2023/0385410 A1 Nov. 30, 2023

Related U.S. Application Data

(60) Provisional application No. 63/345,683, filed on May 25, 2022.

(51) Int. Cl.
*G06F 21/55* (2013.01)
*G06F 9/30* (2018.01)
(Continued)

(52) U.S. Cl.
CPC ........ *G06F 21/556* (2013.01); *G06F 9/30047* (2013.01); *G06F 9/3858* (2023.08);
(Continued)

(58) Field of Classification Search
CPC .... G06F 9/30047; G06F 21/54; G06F 21/552; G06F 21/79; G06F 21/556; G06F 9/3858
See application file for complete search history.

(56) References Cited

U.S. PATENT DOCUMENTS

| 11,868,265 B2* | 1/2024 | Fuller ................. G06F 12/0868 |
| 2019/0042417 A1* | 2/2019 | Sukhomlinov ..... G06F 12/0875 |

(Continued)

FOREIGN PATENT DOCUMENTS

WO    2020000335 A1    1/2020

OTHER PUBLICATIONS

"International Search Report and Written Opinion Issued in PCT Application No. PCT/US23/014215", Mailed Date: Jun. 2, 2023, 11 Pages.

(Continued)

*Primary Examiner* — Joseph P Hirl
*Assistant Examiner* — Aayush Aryal
(74) *Attorney, Agent, or Firm* — Ranjeev Singh; Singh Law, PLLC

(57) ABSTRACT

Systems and methods related to flush plus reload cache side-channel attack mitigation are described. An example method for mitigating a side-channel timing attack in a system including a processor having at least one cache is described. The method includes receiving a first instruction, where the first instruction, when executed by the processor, is configured to flush at least one cache line from the at least one cache associated with the processor. The method further includes, prior to execution of the first instruction by the processor, automatically mapping the first instruction to a second instruction such that the at least one cache line is not flushed from the at least one cache even in response to receiving the first instruction.

20 Claims, 6 Drawing Sheets

(51) Int. Cl.
*G06F 9/38* (2018.01)
*G06F 12/0891* (2016.01)
*G06F 21/54* (2013.01)
*G06F 21/79* (2013.01)

(52) U.S. Cl.
CPC ............ *G06F 21/54* (2013.01); *G06F 21/552* (2013.01); *G06F 21/79* (2013.01)

(56) References Cited

U.S. PATENT DOCUMENTS

| | | |
|---|---|---|
| 2019/0042747 A1 | 2/2019 | Sukhomlinov et al. |
| 2019/0050230 A1 | 2/2019 | Branco et al. |
| 2019/0138720 A1* | 5/2019 | Grewal ................. G06F 9/3863 |
| 2022/0113978 A1* | 4/2022 | Poornachandran .... G06N 3/063 |
| 2023/0098117 A1* | 3/2023 | Wang .................. G06F 12/1483 |
| | | 726/23 |

OTHER PUBLICATIONS

Saileshwar, et al., "Lookout for Zombies: Mitigating Flush+Reload Attack on Shared Caches by Monitoring Invalidated Lines", In Repository of arXiv:1906.02362v1, Jun. 6, 2019, 12 Pages.

Yarom, et al., "FLUSH+RELOAD: a High Resolution, Low Noise, L3 Cache Side-Channel Attack", In Proceedings of the 23rd USENIX Security Symposium, Aug. 20, 2014, pp. 719-732.

* cited by examiner

600

SYSTEMS AND METHODS FOR FLUSH PLUS RELOAD CACHE SIDE-CHANNEL ATTACK MITIGATION

CROSS-REFERENCE TO A RELATED APPLICATION

This application claims the benefit of U.S. Provisional Application No. 63/345,683, filed May 25, 2022, titled "SYSTEMS AND METHODS FOR FLUSH PLUS RELOAD CACHE-SIDE CHANNEL ATTACK MITIGATION" the entire contents of which are hereby incorporated herein by reference.

BACKGROUND

Multiple users or tenants may share systems, including computing systems and communications systems. Computing systems may include the public cloud, the private cloud, or a hybrid cloud having both public and private portions. The public cloud includes a global network of servers that perform a variety of functions, including storing and managing data, running applications, and delivering content or services, such as streaming videos, provisioning electronic mail, providing office productivity software, or handling social media. The servers and other components may be located in data centers across the world. While the public cloud offers services to the public over the Internet, businesses may use private clouds or hybrid clouds. Both private and hybrid clouds also include a network of servers housed in data centers.

Multiple tenants may use compute, storage, and networking resources associated with the servers in the cloud. The compute, storage, and networking resources may be provisioned using a host operating system (OS) installed on a compute node (e.g., a server) in a data center. Each host OS may allow multiple compute entities, such as a virtual machine, to access the compute and memory resources associated with a respective compute node. Memory pages maintained by the host OS may be shared among various compute entities (e.g., containers) being supported by the host OS. Such sharing of pages may lead to cache side channels between processes creating the possibility of side-channel attacks, such as the flush plus reload cache side-channel attack. Accordingly, there is a need for systems and methods to mitigate such side-channel attacks.

SUMMARY

In one example, the present disclosure relates to a method for mitigating a side-channel timing attack in a system including a processor having at least one cache. The method may include receiving a first instruction, where the first instruction, when executed by the processor, is configured to flush at least one cache line from the at least one cache associated with the processor. The method may further include prior to execution of the first instruction by the processor, automatically mapping the first instruction to a second instruction such that the at least one cache line is not flushed from the at least one cache even in response to receiving the first instruction.

In another example, the present disclosure relates to a processor having at least one cache. The processor may include circuitry configured to receive a first instruction, wherein the first instruction, when executed by the processor, is configured to flush at least one cache line from the at least one cache associated with the processor. The circuitry may further be configured to prior to execution of the first instruction by the processor, automatically map the first instruction to a second instruction such that the at least one cache line is not flushed from the at least one cache even in response to receiving the first instruction.

In yet another example, the present disclosure relates to a method for mitigating a side-channel timing attack in a system including a processor having at least one cache. The method may include receiving a first instruction, where the first instruction, when executed by the processor, is configured to flush at least cache line from the at least one cache associated with the processor. The method may further include prior to execution of the first instruction by the processor, a microcode unit associated with the processor automatically mapping the first instruction to a second instruction such that the at least one cache line is not flushed from the at least one cache even in response to receiving the first instruction, where the automatically mapping the first instruction to the second instruction comprises applying a microcode patch to the processor.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

DETAILED DESCRIPTION

Examples described in this disclosure relate to systems and methods for flush plus reload cache side-channel attack mitigation. Certain examples relate to flush plus reload cache side-channel attack mitigation in a computing system or a multi-tenant computing system. The multi-tenant computing system may be a public cloud, a private cloud, or a hybrid cloud. The public cloud includes a global network of servers that perform a variety of functions, including storing and managing data, running applications, and delivering content or services, such as streaming videos, electronic mail, office productivity software, or social media. The servers and other components may be located in data centers across the world. While the public cloud offers services to the public over the Internet, businesses may use private clouds or hybrid clouds. Both private and hybrid clouds also include a network of servers housed in data centers. Compute entities may be executed using compute and memory resources of the data center. As used herein, the term "compute entity" encompasses, but is not limited to, any executable code (in the form of hardware, firmware, software, or in any combination of the foregoing) that implements a functionality, a virtual machine, an application, a service, a micro-service, a container, or a unikernel for serverless computing. Alternatively, compute entities may be executing on hardware associated with an edge-compute device, on-premises servers, or other types of systems, including communications systems, such as base stations (e.g., 5G or 6G base stations).

Caches help alleviate the long latency associated with access to main memories (e.g., double data rate (DDR) dynamic random access memory (DRAM)) by providing data with low latency. A processor may have access to a cache hierarchy, including L1 caches, L2 caches, and L3 caches, where the L1 caches may be closest to the processing cores and the L3 caches may be the furthest. Data accesses may be made to the caches first and if the data is found in the cache, then it is viewed as a hit. If the data, however, is not found in the cache, then it is viewed as a miss, and the data will need to be loaded from the main memory (e.g., the DRAM). Unfortunately, the timing difference between the cache hit and a cache miss can be used as a side-channel by an adversary to infer the access pattern and obtain unauthorized information from the system. Such cache attacks have been demonstrated to leak sensitive information like encryption keys or other credentials and secrets.

Figure 1:
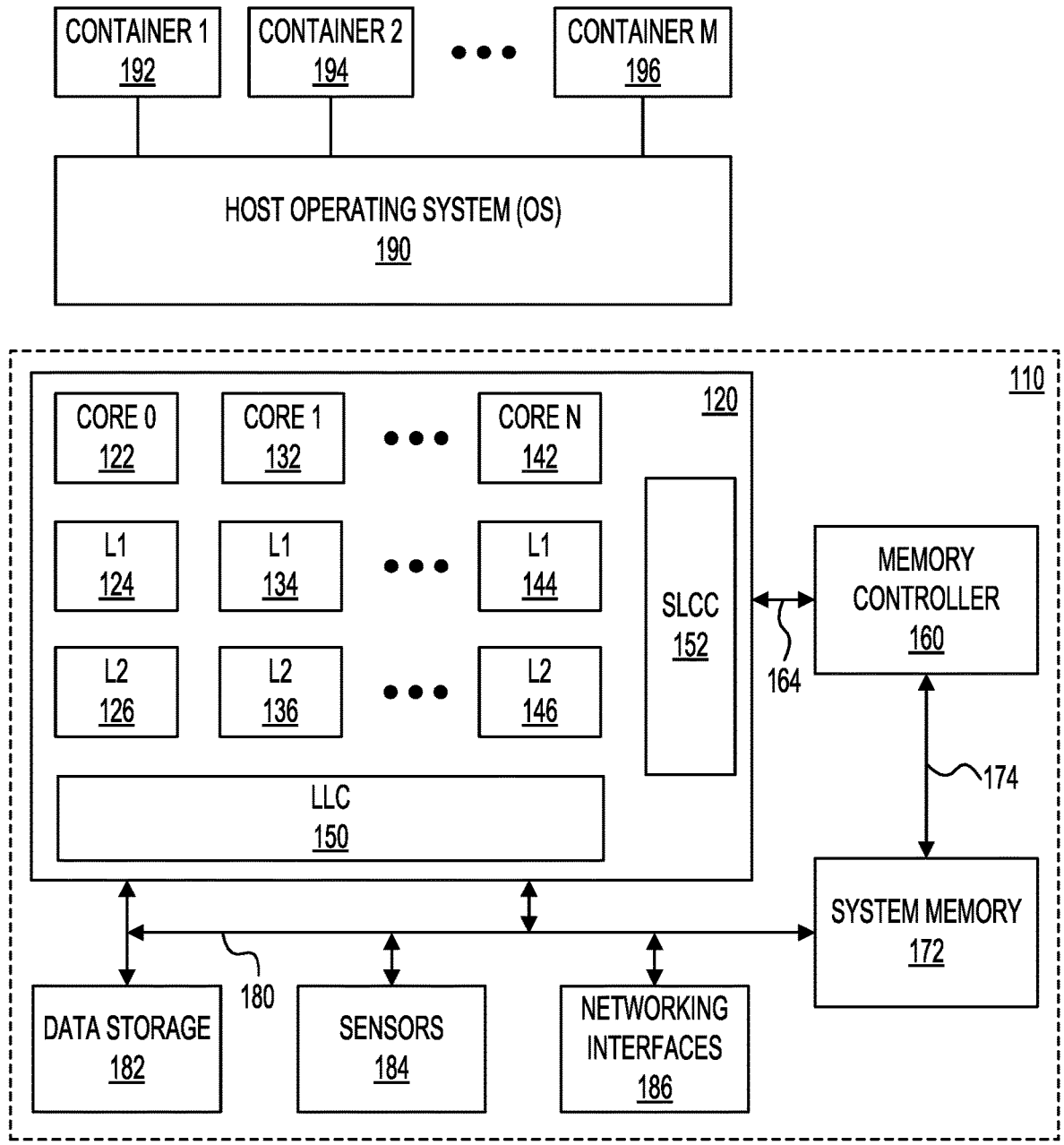
FIG. 1 is a block diagram of a system in accordance with one example.

FIG. 1 is a block diagram of a system 100 in accordance with one example. Each system may include compute resources (e.g., a processor) and memory resources (e.g., caches and system memory). As an example, system 100 may include a compute node 110 and a host operating system 190 supported by compute node 110. Compute node 110 may include a central processing unit (CPU) 120, which in turn may include several processing cores and different cache levels. In this example, CPU 120 may include core 0 122, core 1 132, and core N 142, where N is an integer equal to the number of cores in the CPU, which in this example may range from 3 to 256. Core 0 122 may have exclusive access to level 1 and level 2 caches (e.g., L1 cache 124 and L2 cache 126). Core 1 132 may have exclusive access to level 1 and level 2 caches (e.g., L1 cache 134 and L2 cache 136). Core N 142 may have exclusive access to level 1 and level 2 caches (e.g., L1 cache 144 and L2 cache 146). Each of the cores may further have access to a shared last level cache (LLC) 150, which may be viewed as the level 3 cache in the cache hierarchy. Although FIG. 1 shows a certain hierarchy of caches, CPU 120 may include caches that are non-hierarchical and are arranged differently.

With continued reference to FIG. 1, CPU 120 may further include a system level cache controller (e.g., SLCC 152) for managing transactions between the caches and the system memory. SLCC 152 may be coupled via bus 164 to memory controller 160 (e.g., a DRAM controller). Memory controller 160 may be coupled to system memory 172 via bus 174. System memory 172 may be any combination of non-volatile storage or volatile storage (e.g., flash memory, DRAM, SRAM, or other types of memories). A bus system 180 may further couple CPU 120 and system memory 172 to other components of compute node 110, including data storage 182, sensors 184, and networking interfaces 186. Sensors 184 may include telemetry or other types of sensors configured to detect, and/or receive, information (e.g., memory usage by various virtual machines being executed by various compute nodes in a data center). Sensors 184 may further include sensors configured to sense conditions associated with CPUs, memory or other storage components, FPGAs, motherboards, baseboard management controllers, or the like. Network interfaces 186 may include communication interfaces, such as Ethernet, cellular radio, Bluetooth radio, UWB radio, or other types of wireless or wired communication interfaces. In addition, although not shown, compute node 110 may further include I/O port(s) such as Ethernet ports, Fiber-optic ports, wireless ports, or other communication or diagnostic ports. Although each compute node in FIG. 1 is shown is having a single CPU, each compute node may include additional CPUs, and other devices, such as graphics processor units (GPU)s, field programmable gate arrays (FPGA)s, application specific integrated circuits (ASIC)s, or other devices. In addition, each compute node 110 may have system memory 172 organized as memory modules. Examples of such memory modules include, but are not limited to, dual-in-line memory modules (DIMMs) or single-in-line memory modules (SIMMs). Memory included in these modules may be dynamic random access memory (DRAM), flash memory, static random access memory (SRAM), phase change memory, magnetic random access memory, or any other type of memory technology.

Still referring to FIG. 1, each compute node 110 may be configured to execute several compute entities. In this example, host OS 190 may support several containers (e.g., container 1 192, container 2 194, and container M 196, where M is a positive integer). In this example, the containers may be light weight virtual interface modules that may share the host OS 190 to support other applications. In this manner, these containers may share a significant percentage of the codebase, including shared libraries, making the containers susceptible to side-channel attacks through the caches associated with a CPU executing the shared libraries. Other compute entities that share libraries or other code may similarly be susceptible to similar side-channel attacks.

In one example, compute node 110 may be part of a data center. As used in this disclosure, the term data center may include, but is not limited to, some or all of the data centers owned by a cloud service provider, some or all of the data centers owned and operated by a cloud service provider, some or all of the data centers owned by a cloud service provider that are operated by a customer of the service provider, any other combination of the data centers, a single data center, or even some clusters in a particular data center. In one example, each cluster may include several identical compute nodes. Thus, a cluster may include compute nodes including a certain number of CPU cores and a certain amount of memory. Instead of compute nodes, other types of hardware such as edge-compute devices, on-premises servers, or other types of systems, including communications systems, such as base stations (e.g., 5G or 6G base stations) may also be used. Although FIG. 1 shows system 100 as having a certain number of components, including a compute node and memory components, arranged in a certain manner, system 100 may include additional or fewer components, arranged differently.

As explained earlier, the timing difference between a cache hit and a cache miss can be used as a side-channel by an attacker to infer the access pattern and obtain unauthorized information from the system. Such cache attacks have been demonstrated to leak sensitive information like encryption keys or other credentials and secrets. One such attack is referred to as the flush plus reload attack. Referring back to FIG. 1, the flush plus reload attack is described assuming an attacker A is accessing compute node 110 of FIG. 1 through one of the containers and a victim V is also accessing compute node 110 of FIG. 1 through one of the containers. This example further assumes that attacker A and victim V map to a shared library (e.g., a cryptographic library for executing AES-cryptographic functions) stored in system memory 172 of FIG. 1. As part of faster access to the shared library, the executable code corresponding to the shared library may be stored in the cache hierarchy associated with CPU 120 of compute node 110 of FIG. 1. As part of the flash plus reload attack, once the shared library has been cached, attacker A flushes the shared library from the cache to the system memory. As an example, for the x86-based CPUs the flush operation may be accomplished by using the CLFLUSH instruction, which can be executed in the user mode. The CLFLUSH instruction flushes a given cache line from all caching hierarchy (e.g., L1 cache, L2 cache, and the last-level cache (LLC)) and writes back any dirty data to the system memory. Using the CLFLUSH instruction, the attacker can mount timing attacks on the victim.

Next, after flushing the cache, attacker A waits for a sampling interval (e.g., one microsecond, one millisecond, or some other appropriate amount of time for a certain CPU). After the expiration of the sampling interval, attacker A reload the shared library. If the reload operation takes a short amount of time, then attacker A knows that victim V had accessed the shared library from the memory. As part of that access by victim V, the cache controller loads the shared library into the associated caches. Alternatively, if the reload operation takes a longer amount of time, then attacker A knows that victim V has not accessed the shared library during the sampling interval. Attacker A can then reload the shared library, flush it again, wait for the sampling interval, and decipher whether victim V accessed the shared library. By repeatedly flushing and reloading the shared library, attacker A can have access to a plot of samples over time and can use those samples to discern patterns. The patterns may provide sufficient information to attacker A over time to determine the cryptographic key victim V is using. Existing solutions to the flush plus reload attack are inferior for several reasons. As an example, a solution involves tracking zombie cache lines. This solution, however, is an invasive and complex solution to implement. As an example, this solution requires changes to the CPU hardware and thus it cannot be used with the existing CPUs. In addition, the tracking of zombie cache lines not only impacts the performance of the CPU but also uses up storage associated with the CPU.

To address the flush plus reload attack, a solution involving using a microcode patch to autonomously map all cache flush instructions (e.g., CLFLUSH instructions) to a cache write back instruction (e.g., CLWB instructions) is described. Like the CLFLUSH instruction, the CLWB instruction writes back dirty data to memory. However, unlike the CLFLUSH instruction, the CLWB instructions retains any non-modified copies of the line in the cache hierarchy. As a result, the attacker (e.g., attacker A described earlier) can no longer influence the access timing for the victim (e.g., victim V described earlier), thus defeating the flush plus reload attack.

Figure 2:
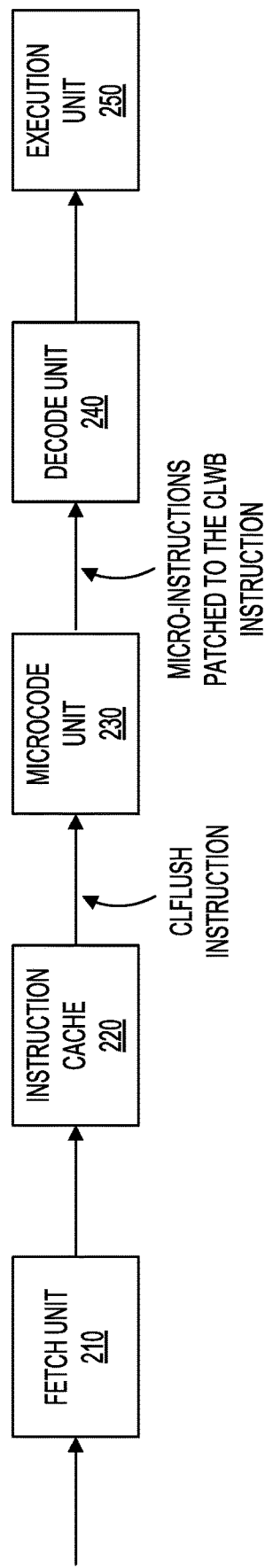
FIG. 2 shows a block diagram of a processor associated with the system of FIG. 1.

FIG. 2 shows a diagram of a processor 200 that may include functionality to remap the CLFLUSH instruction to the CLWB instruction. Processor 200 may be any complex instruction set computer (CISC) ISA compatible CPU or another type of processor. Processor 200 includes a fetch unit 210, an instruction cache 220, a microcode unit 230, a decode unit 240, and an execution unit 250. Additional aspects of processor 200, including branch prediction logic, reorder logic, and issue logic, are not shown. Fetch unit 210 fetches instructions (e.g., using the addresses provided by the branch prediction logic (not shown)) and stores the fetched instructions into instruction cache 220. Instructions are then provided to microcode unit 230, which translates the fetched instructions (e.g., the CLFLUSH instruction) into micro-instructions. A microcode patch may be uploaded to the CPU (e.g., CPU 120 of FIG. 1) by the firmware (e.g., the BIOS or the UEFI) associated with the CPU during the boot process, After uploading, the microcode patch may be stored in a microcode patch RAM associated with microcode unit 230.

The microcode patch may contain a number of micro-instructions corresponding to any instruction (e.g., the CLFLUSH instruction) that is being patched. As explained with respect to FIG. 3, when the CLFLUSH instruction is encountered by microcode unit 230, the micro-instructions for the CLFLUSH instructions are obtained from the microcode patch RAM. In one example, the microcode instructions in microcode patch RAM correspond to the CLWB instruction even when the CLFLUSH instruction is encountered by microcode unit 310. This, in turn, results in a remapping of the CLFLUSH instruction as a CLWB instruction. Using similar logic, any other cache flush instruction similar to the CLFLUSH instruction may be remapped as a cache write back instruction similar to the CLWB instruction. The micro-instructions are then decoded by decode unit 240 and the cache write back operation is performed instead of the cache flush operation. This results in mitigating the flush plus reload technique described earlier. Although FIG. 2 shows processor 200 as including certain components arranged in a certain way, processor 200 may include additional or fewer components that are arranged differently. In addition, although FIG. 2 describes the mitigation of the flush plus reload technique with respect to the CLFLUSH instruction, any other cache flush instruction may also be processed in an equivalent way to mitigate the flush plus reload side-channel attack.

Figure 3:
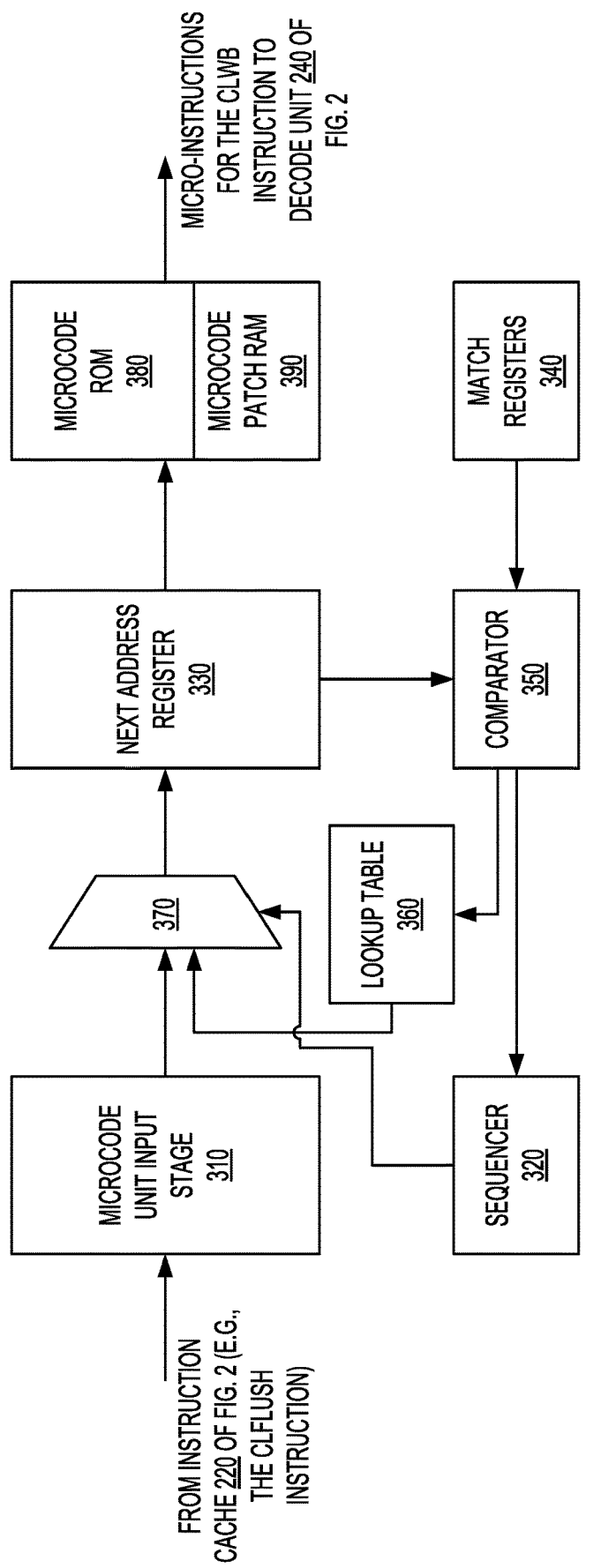
FIG. 3 shows an example implementation of a microcode unit included in the processor of FIG. 2.

FIG. 3 shows an example implementation of a microcode unit 300 included in processor 200 of FIG. 2. Microcode unit 300 (e.g., corresponding to microcode unit 230 of FIG. 2) may include the logic, registers, and other components required for remapping a cache line instruction (e.g., the CLFLUSH instruction) to a cache write back instruction (e.g., the CLWB instruction). In this example, microcode unit 300 may include a microcode unit input stage 310, a sequencer 320, a next address register 330, match registers 340, a comparator 350, a lookup table 360, a multiplexer 370, a microcode read only memory (ROM) 380, and a microcode patch random access memory (RAM) 390. As explained earlier a microcode patch for remapping the CLFLUSH instruction to the micro-instructions corresponding to the CLWB instruction may be loaded into microcode patch RAM 390. Microcode input unit stage 310 may calculate the address (e.g., the address for the micro-instructions stored in microcode ROM 380 or microcode patch RAM 390) for the first micro-instruction that corresponds to the instruction received from instruction cache 220 of FIG.

With continued reference to FIG. 3, an instruction (e.g., the CLFLUSH instruction) may require the decoding of a set of micro-instructions before being decoded. Sequencer 320 controls the multiplexer 370 to supply the correct next address to next address register 330. Sequencer 320 may be implemented using finite state machines or other logic. Sequencer 320 ensures that all of the micro-instructions corresponding to an instruction are processed in sequence. The address stored in next address register 330 is provided to comparator 350. Comparator 350 compares the address provided by next address register 330 with the addresses stored in match registers 340. If there is a match between the address and any of the addresses stored in match register 340, then a patch from microcode patch RAM 390 is implemented. In this example, when there is a match, a signal from comparator 350 is used to select an address from lookup table 360 for microcode patch RAM 390. Lookup table 360 may be implemented as a programmable logic array or using other logic. Sequencer 320 controls multiplexer 370 to feed the looked up address from lookup table 360 for further processing. As a result, instead of the micro-instructions located in microcode ROM 380, the micro-instructions located in microcode patch RAM 390 are provided to the decoder (e.g., decode unit 240 of FIG. 2). Thus, in this example, match registers 340 include an entry that allows for the micro-instructions corresponding to the CLWB instruction be supplied from microcode patch RAM 390 when processing the CLFLUSH instruction. This, in turn, results in a mapping of the CLFLUSH instruction to the CLWB instruction. Although FIG. 3 shows microcode unit 300 as having a certain number of components that are arranged in a certain manner, microcode unit 300 may include additional or fewer components that are arranged differently. In addition, although FIG. 3 describes the mitigation of the flush plus reload technique with respect to the CLFLUSH instruction, any other cache flush instruction may also be processed in an equivalent way to mitigate the flush plus reload side-channel attack.

Among other advantages, the example solutions described herein are compatible with existing x86 processors and the related functionality. The CLFLUSH instruction was designed primarily for non-coherent direct memory access (DMA) devices (e.g., Peripheral Component Interconnect Express (PCIe) devices) that may write to the system memory directly. In such an environment, if an application wants to read the latest data, it will first execute the CLFLUSH instruction, let the non-coherent DMA device write the data to the system memory, and then perform a load operation. This load instruction would result in a miss with respect to the cache and the latest data will be obtained from the system memory (e.g., the DRAM). However, over time, modern CPUs (e.g., Intel and AMD CPUs) have implemented coherent DMA. This means that when a non-coherent DMA device updates data (e.g., data in the form of a cache line), it gets updated not just in the system memory but also in any associated CPU caches. Advantageously, this automatic update eliminates the need for using the CLFLUSH instruction.

In addition, even if the CLFLUSH instruction is present in legacy code, the automatic update also makes it safe to remap the CLFLUSH instruction to the CLWB instruction. The CLFLUSH instruction may also be used for checkpointing and flushing the contents of volatile memory to persistent memory (e.g., flash memory). However, because the CLWB instruction flushes any dirty cache lines to the system memory (e.g., the DRAM), the use of the CLWB instruction (instead of the CLFLUSH instruction) does not create any issues.

Figure 4:
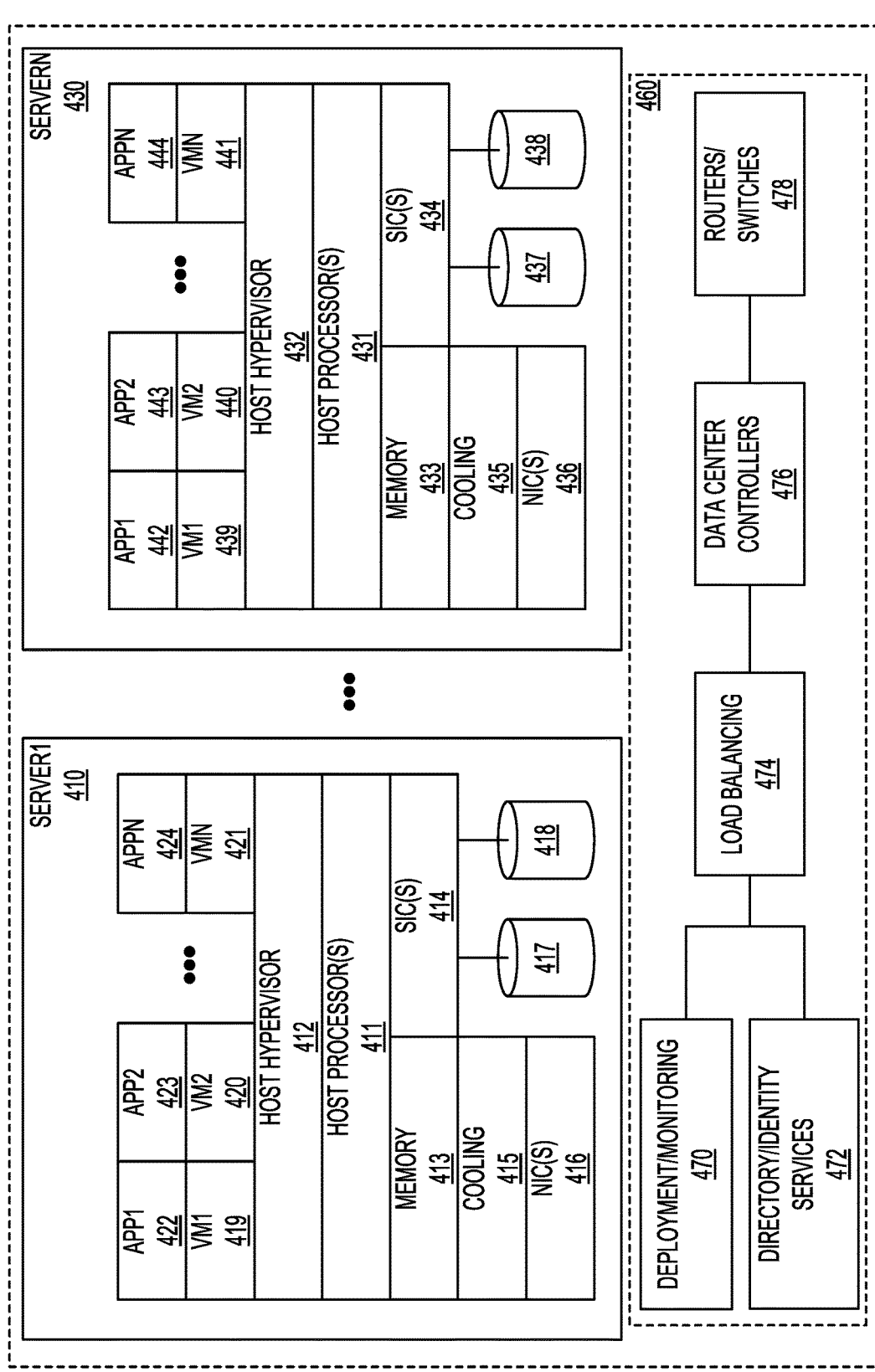
FIG. 4 shows a data center for implementing flush plus reload cache side-channel attack mitigation in accordance with one example.

FIG. 4 shows a data center 400 for implementing flush plus reload cache side-channel attack mitigation in accordance with one example. As an example, data center 400 may include several clusters of racks including platform hardware, such as compute resources, storage resources, networking resources, or other types of resources. Compute resources may be offered via compute nodes provisioned via servers that may be connected to switches to form a network. The network may enable connections between each possible combination of switches. Data center 400 may include server1 410 and serverN 430 each of which may be implemented using similar functionality as described earlier for compute node 110 of FIG. 1. Data center 400 may further include data center related functionality 460, including deploymentimonitorina 470, directory/identity services 472, load balancing 474, data center controllers 476 (e.g., software defined networking (SDN) controllers and other controllers), and routers/switches 478. Server1 410 may include CPU(s) 411, host hypervisor 412, memory 413, storage interface controller(s) (SIC(s)) 414, cooling 415, network interface controller(s) (NIC(s)) 416, and storage disks 417 and 418. ServerN 430 may include CPU(s) 431, host hypervisor 432, memory 433, storage interface controller(s) (SIC(s)) 434, cooling 435, network interface controller(s) (NIC(s)) 436, and storage disks 437 and 438. Server1 410 may be configured to support virtual machines (or containers), including VM1 419, VM2 420, and VMN 421. The virtual machines may further be configured to support applications, such as APP1 422, APP2 423, and APPN 424. ServerN 430 may be configured to support virtual machines (or containers), including VM1 439, VM2 440, and VMN 441. The virtual machines may further be configured to support applications, such as APP1 442, APP2 443, and APPN 444. Each of host hypervisors 412 and 432 may reference shared libraries that may be used to support any compute entities, including the containers described earlier with respect to FIG. 1.

With continued reference to FIG. 4, in one example, data center 400 may be enabled for multiple tenants using the Virtual eXtensible Local Area Network (VXLAN) framework. Each virtual machine (VM) may be allowed to communicate with VMs in the same VXLAN segment. Each VXLAN segment may be identified by a VXLAN Network Identifier (VNI). Although FIG. 4 shows data center 400 as including a certain number of components arranged and coupled in a certain way, it may include fewer or additional components arranged and coupled differently. In addition, the functionality associated with data center 800 may be distributed or combined, as needed.

Figure 5:
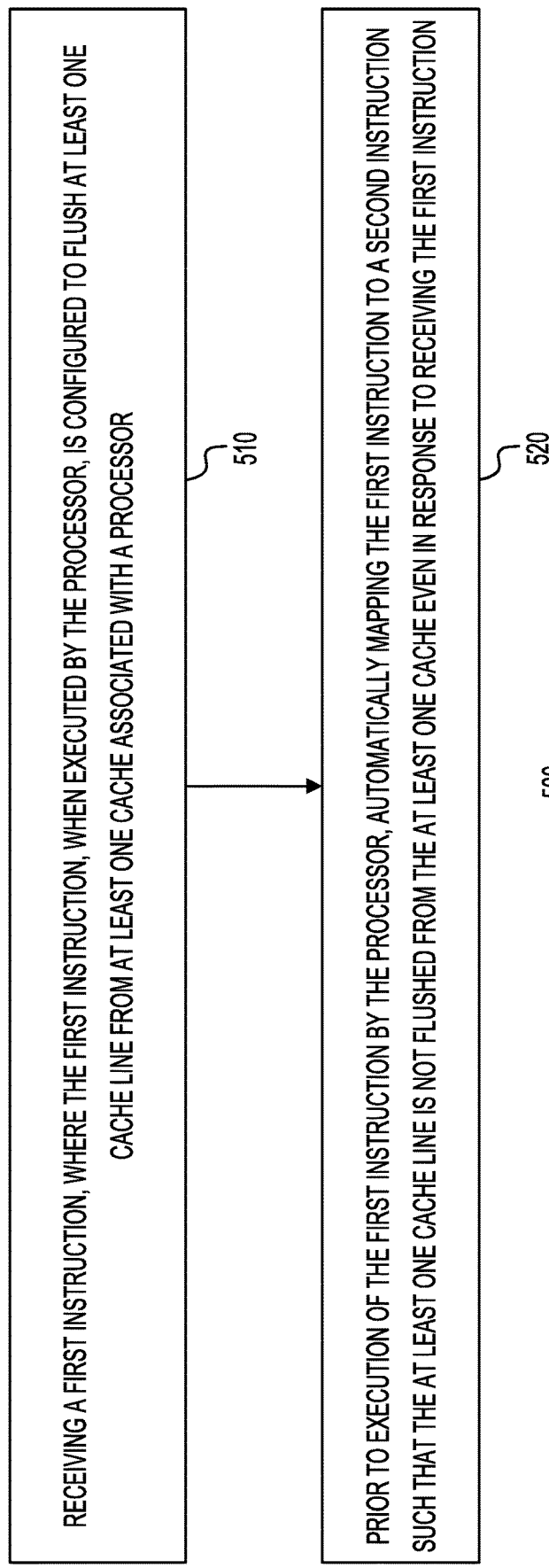
FIG. 5 shows a flow chart of an example method for implementing flush plus reload cache side-channel attack mitigation in accordance with one example.

FIG. 5 shows a flow chart 500 of an example method for mitigating a side-channel timing attack in a system including a processor having at least one cache. In one example, the steps associated with this method may be executed by various components of the systems described earlier (e.g., system 100 of FIG. 1 and processor 200 of FIG. 2). Step 510 may include receiving a first instruction, where the first instruction, when executed by the processor, is configured to flush at least one cache line from the at least one cache associated with the processor. As an example, this step may include receiving the CLFLUSH instruction as the first instruction. As described earlier, an attacker may use the flush plus reload attack to steal another user's information from the cache associated with the processor.

Step 520 may include, prior to execution of the first instruction by the processor, automatically mapping the first instruction to a second instruction such that the at least one cache line is not flushed from the at least one cache even in response to receiving the first instruction. As an example, this step may include receiving the CLFLUSH instruction as the first instruction and automatically mapping the CLFLUSH instruction to the second instruction (e.g., the CLWB instruction). As explained earlier, a microcode patch may be applied to the processor by loading such a patch during boot time. The microcode patch itself may be loaded from a flash memory associated with a computing system including the processor. Additional details regarding one way to apply the patch are provided earlier with respect to FIG. 3.

Figure 6:
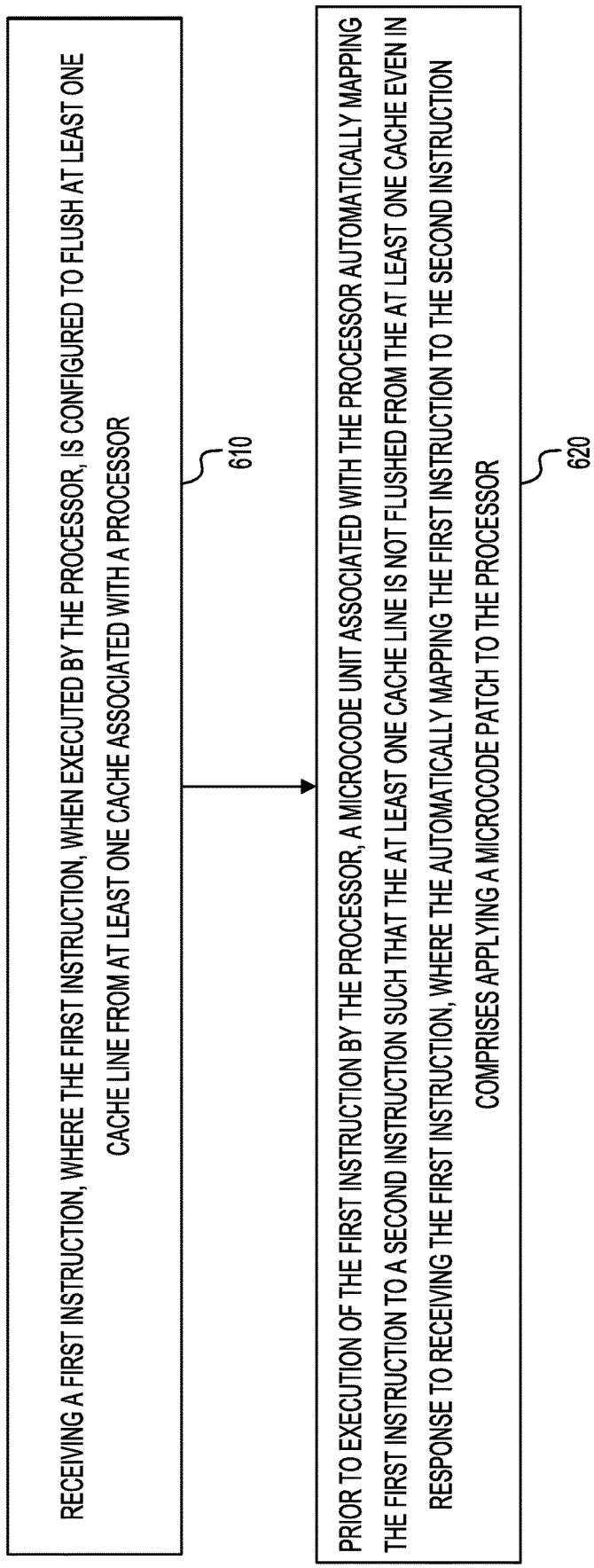
FIG. 6 shows a flow chart of another example method for implementing flush plus reload cache side-channel attack mitigation in accordance with one example.

FIG. 6 shows a flow chart 600 of another example method for mitigating a side-channel timing attack in a system including a processor having at least one cache. In one example, the steps associated with this method may be executed by various components of the systems described earlier (e.g., system 100 of FIG. 1 and processor 200 of FIG. 2). Step 610 may include receiving a first instruction, where the first instruction, when executed by the processor, is configured to flush at least one cache line from the at least one cache associated with the processor. As an example, this step may include receiving the CLFLUSH instruction as the first instruction. As described earlier, an attacker may use the flush plus reload attack to steal another users information from the cache associated with the processor.

Step 620 may include, prior to execution of the first instruction by the processor, a microcode unit associated with the processor automatically mapping the first instruction to a second instruction such that the at least one cache line is not flushed from the at least one cache even in response to receiving the first instruction, wherein the automatically mapping the first instruction to the second instruction comprises applying a microcode patch to the processor. As an example, this step may include receiving the CLFLUSH instruction as the first instruction and a microcode unit (e.g., microcode unit 230 of FIG. 2) automatically mapping the CLFLUSH instruction to the second instruction (e.g., the CLWB instruction). As explained earlier, a microcode patch may be applied to the processor by loading such a patch during boot time. The microcode patch itself may be loaded from a flash memory associated with a computing system including the processor. Additional details regarding one way to apply the patch are provided earlier with respect to FIG. 3.

In conclusion, the present disclosure relates to a method for mitigating a side-channel timing attack in a system including a processor having at least one cache. The method may include receiving a first instruction, where the first instruction, when executed by the processor, is configured to flush at least one cache line from the at least one cache associated with the processor. The method may further include, prior to execution of the first instruction by the processor, automatically mapping the first instruction to a second instruction such that the at least one cache line is not flushed from the at least one cache even in response to receiving the first instruction.

The processor may include a microcode unit. The automatically mapping the first instruction to the second instruction may include the microcode unit applying a microcode patch to the processor. The first instruction may comprise a cache flush instruction and the second instruction may comprise a cache write back instruction.

The microcode patch may include micro-instructions for the cache write back instruction such that an application of the microcode patch to the processor results in micro-instructions for the cache write back instruction being processed by the processor instead of the micro-instructions for the cache flush instruction. The at least one cache may include a hierarchical arrangement of caches, and when executed each of the cache flush instruction and the cache write back instruction may write back dirty cache lines to a memory associated with the processor but unlike the cache flush instruction, the cache write back instruction may retain any non-modified copies of cache lines in the hierarchical arrangement of caches. The side-channel timing attack may comprise a flush plus reload attack.

In another example, the present disclosure relates to a processor having at least one cache. The processor may include circuitry configured to receive a first instruction, wherein the first instruction, when executed by the processor, is configured to flush at least one cache line from the at least one cache associated with the processor. The circuitry may further be configured to prior to execution of the first instruction by the processor, automatically map the first instruction to a second instruction such that the at least one cache line is not flushed from the at least one cache even in response to receiving the first instruction.

The circuitry may comprise a microcode unit. The circuitry may be configured to automatically map the first instruction to the second instruction by applying a microcode patch to the processor. The first instruction may comprise a cache flush instruction and the second instruction may comprise a cache write back instruction.

The microcode patch may include micro-instructions for the cache write back instruction such that an application of the microcode patch to the processor results in micro-instructions for the cache write back instruction being processed by the processor instead of the micro-instructions for the cache flush instruction. The at least one cache may include a hierarchical arrangement of caches, and when executed each of the cache flush instruction and the cache write back instruction may write back dirty cache lines to a memory associated with the processor but unlike the cache flush instruction, the cache write back instruction may retain any non-modified copies of cache lines in the hierarchical arrangement of caches. The side-channel timing attack may comprise a flush plus reload attack.

In yet another example, the present disclosure relates to a method for mitigating a side-channel timing attack in a system including a processor having at least one cache. The method may include receiving a first instruction, where the first instruction, when executed by the processor, is configured to flush at least cache line from the at least one cache associated with the processor. The method may further include prior to execution of the first instruction by the processor, a microcode unit associated with the processor automatically mapping the first instruction to a second instruction such that the at least one cache line is not flushed from the at least one cache even in response to receiving the first instruction, where the automatically mapping the first instruction to the second instruction comprises applying a microcode patch to the processor.

The first instruction may comprise a cache flush instruction and the second instruction may comprise a cache write back instruction. The microcode patch may comprise micro-instructions for the cache write back instruction such that an application of the microcode patch to the processor results in micro-instructions for the cache write back instruction being processed by the processor instead of the micro-instructions for the cache flush instruction.

The at least one cache may include a hierarchical arrangement of caches, and when executed each of the cache flush instruction and the cache write back instruction may write back dirty cache lines to a memory associated with the processor but unlike the cache flush instruction, the cache write back instruction may retain any non-modified copies of cache lines in the hierarchical arrangement of caches. The side-channel timing attack may comprise a flush plus reload attack.

It is to be understood that the methods, modules, and components depicted herein are merely exemplary. Alternatively, or in addition, the functionality described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality. Merely because a component, which may be an apparatus, a structure, a system, or any other implementation of a functionality, is described herein as being coupled to another component does not mean that the components are necessarily separate components. As an example, a component A described as being coupled to another component B may be a sub-component of the component B, the component B may be a sub-component of the component A, or components A and B may be a combined sub-component of another component C.

The functionality associated with some examples described in this disclosure can also include instructions stored in a non-transitory media. The term "non-transitory media" as used herein refers to any media storing data and/or instructions that cause a machine to operate in a specific manner. Exemplary non-transitory media include non-volatile media and/or volatile media. Non-volatile media include, for example, a hard disk, a solid-state drive, a magnetic disk or tape, an optical disk or tape, a flash memory, an EPROM, NVRAM, PRAM, or other such media, or networked versions of such media. Volatile media include, for example, dynamic memory such as DRAM, SRAM, a cache, or other such media. Non-transitory media is distinct from, but can be used in conjunction with transmission media. Transmission media is used for transferring data and/or instruction to or from a machine. Exemplary transmission media include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:

1. A processor comprising:
    an instruction cache;
    a fetch unit to fetch instructions and store a set of fetched instructions in the instruction cache, wherein the set of fetched instructions includes a plurality of cache flush instructions, wherein each of the plurality of cache flush instructions, if executed by the processor, is configured to flush at least one cache line from the at least one cache associated with the processor;
    a microcode read-only memory (ROM) to store micro-instructions, including a first set of micro-instructions for performing the cache flush instruction;
    a microcode patch random-access memory (RAM) to supply a second set of micro-instructions corresponding to a cache write back instruction;
    a decoding unit to receive the second set of micro-instructions from the microcode patch RAM, instead of the first set of micro-instructions from the microcode ROM, even when an incoming instruction received by the instruction cache comprises the cache flush instruction; and
    an execution unit to execute the second set of micro-instructions corresponding to the cache write back instruction, resulting in an automatic mapping of the plurality of cache flush instructions into a respective cache write back instruction.

2. The processor of claim 1, further comprising a microcode input stage to receive the cache flush instruction.

3. The processor of claim 2, further comprising a multiplexer having a first input and a second input, wherein the first input is coupled to an output of the microcode input stage, and wherein the second input is coupled to an output of a lookup table.

4. The processor of claim 3, further comprising a sequencer for supplying a control signal to the multiplexer.

5. The processor of claim 1, wherein the cache flush instruction is configured to flush additional cache lines from a set of caches corresponding to a caching hierarchy.

6. The processor of claim 5, wherein the cache write back instruction is configured to retain any non-modified copies of cache lines in the set of caches corresponding to the caching hierarchy.

7. The processor of claim 1, wherein the processor is coupled to a flash memory, and wherein a microcode patch from the flash memory is uploaded into the microcode patch RAM.

8. A processor comprising:
an instruction cache;
a fetch unit to fetch instructions and store a set of fetched instructions in the instruction cache, wherein the set of fetched instructions includes a plurality of cache flush instructions, wherein each of the plurality of cache flush instructions, if executed by the processor, is configured to flush at least one cache line from the at least one cache associated with the processor;
a microcode read-only memory (ROM) to store micro-instructions, including a first set of micro-instructions for performing the cache flush instruction;
a microcode patch random-access memory (RAM) to supply a second set of micro-instructions corresponding to a cache write back instruction;
a decoding unit to receive the second set of micro-instructions from the microcode patch RAM, instead of the first set of micro-instructions from the microcode ROM, even when an incoming instruction received by the instruction cache comprises the cache flush instruction; and
an execution unit to execute the second set of micro-instructions corresponding to the cache write back instruction, resulting in an automatic mapping of each of the plurality of cache flush instructions into a respective cache write back instruction, such that the automatic mapping of the plurality of cache flush instructions into the respective cache write back instructions prevents side-channel timing attacks.

9. The processor of claim 8, further comprising a microcode input stage to receive the cache flush instruction.

10. The processor of claim 9, further comprising a multiplexer having a first input and a second input, wherein the first input is coupled to an output of the microcode input stage, and wherein the second input is coupled to an output of a lookup table.

11. The processor of claim 10, further comprising a sequencer for supplying a control signal to the multiplexer.

12. The processor of claim 8, wherein the cache flush instruction is configured to flush additional cache lines from a set of caches corresponding to a caching hierarchy.

13. The processor of claim 12, wherein the cache write back instruction is configured to retain any non-modified copies of cache lines in the set of caches corresponding to the caching hierarchy.

14. The processor of claim 8, wherein the processor is coupled to a flash memory, and wherein a microcode patch from the flash memory is uploaded into the microcode patch RAM.

15. A computing system comprising:
a processor including:
an instruction cache;
a fetch unit to fetch instructions and store a set of fetched instructions in the instruction cache, wherein the set of fetched instructions includes a plurality of cache flush instructions, wherein each of the plurality of cache flush instructions, if executed by the processor, is configured to flush at least one cache line from the at least one cache associated with the processor;
a microcode read-only memory (ROM) to store micro-instructions, including a first set of micro-instructions for performing the cache flush instruction;
a microcode patch random-access memory (RAM) to supply a second set of micro-instructions corresponding to a cache write back instruction;
a decoding unit to receive the second set of micro-instructions from the microcode patch RAM, instead of the first set of micro-instructions from the microcode ROM, even when an incoming instruction received by the instruction cache comprises the cache flush instruction; and
an execution unit to execute the second set of micro-instructions corresponding to the cache write back instruction, resulting in an automatic mapping of the plurality of cache flush instructions into a respective cache write back instruction; and
a flash memory configured to store a microcode patch, wherein the microcode patch from the flash memory is uploaded into the microcode patch RAM during booting up of the processor.

16. The processor of claim 15, further comprising a microcode input stage to receive the cache flush instruction.

17. The processor of claim 16, further comprising a multiplexer having a first input and a second input, wherein the first input is coupled to an output of the microcode input stage, and wherein the second input is coupled to an output of a lookup table.

18. The processor of claim 17, further comprising a sequencer for supplying a control signal to the multiplexer.

19. The processor of claim 15, wherein the cache flush instruction is configured to flush additional cache lines from a set of caches corresponding to a caching hierarchy.

20. The processor of claim 19, wherein the cache write back instruction is configured to retain any non-modified copies of cache lines in the set of caches corresponding to the caching hierarchy.

* * * * *